(12) United States Patent  (10) Patent No.: US 9,178,648 B2
Rao et al.  (45) Date of Patent: Nov. 3, 2015

(54) METHOD TO IMPROVE VOICE OVER IP CAPACITY FOR USER EQUIPMENT EMPLOYING VARIABLE RATE VOCODERS

(75) Inventors: Anil M. Rao, Wheaton, IL (US); Robert A. Soni, Randolph, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 408 days.

(21) Appl. No.: 12/654,842

(22) Filed: Jan. 6, 2010

(65) Prior Publication Data

US 2011/0164574 A1    Jul. 7, 2011

(51) Int. Cl.
- H04L 1/00    (2006.01)
- H04W 72/12    (2009.01)
- H04W 88/18    (2009.01)

(52) U.S. Cl.
CPC ............ H04L 1/0007 (2013.01); H04L 1/0025 (2013.01); H04L 1/0046 (2013.01); H04W 72/1289 (2013.01); H04L 1/0008 (2013.01); H04L 1/0038 (2013.01); H04W 88/181 (2013.01)

(58) Field of Classification Search
None
See application file for complete search history.

(56) References Cited

U.S. PATENT DOCUMENTS

| 5,881,053 | A | 3/1999 | Kimball |
| 6,377,817 | B1 | 4/2002 | Hakaste et al. |
| 7,821,982 | B2 | 10/2010 | Chen et al. |
| 2007/0201438 | A1 | 8/2007 | Yoon et al. |
| 2008/0117891 | A1* | 5/2008 | Damnjanovic et al. ........ 370/345 |
| 2008/0299963 | A1 | 12/2008 | Balachandran et al. |
| 2009/0252107 | A1* | 10/2009 | Chun et al. ...................... 370/329 |
| 2010/0014479 | A1* | 1/2010 | Kim ................................ 370/329 |
| 2010/0195614 | A1* | 8/2010 | Nimbalker et al. |
| 2010/0279634 | A1* | 11/2010 | Sagfors et al. ............. 455/127.1 |
| 2011/0110245 | A1* | 5/2011 | Hannu et al. ................... 370/252 |
| 2011/0150085 | A1* | 6/2011 | Andrijanic et al. ...... 375/240.12 |

FOREIGN PATENT DOCUMENTS

| EP | 2 077 646 A1 | 7/2009 |
| JP | 2001-500693 | 1/2001 |
| JP | 2002-543719 | 12/2002 |
| JP | 2004-200923 | 7/2004 |
| WO | WO 2007/053840 A2 | 5/2007 |
| WO | WO 2009-045850 | 4/2009 |
| WO | WO 2009-088345 | 7/2009 |
| WO | WO 2009/088345 A2 | 7/2009 |

OTHER PUBLICATIONS

PCT International Search Report and Written Opinion mailed Apr. 4, 2011.

(Continued)

*Primary Examiner* — Jackie Zuniga Abad
(74) *Attorney, Agent, or Firm* — Harness, Dickey & Pierce, P.L.C.

(57) ABSTRACT

In one embodiment, a message is sent from the wireless network to a user equipment having a variable rate vocoder. The message defines transport block sizes for the user equipment to select from in making uplink transmissions if the user equipment is permitted to vary a packet size for uplink transmission. A scheduling grant is sent to the user equipment, and the scheduling grant includes an indicator indicating that the user equipment is permitted to vary the packet size for uplink transmissions by selecting a transport block size from among the defined transport block sizes.

16 Claims, 4 Drawing Sheets

(56) References Cited

OTHER PUBLICATIONS

"3$^{rd}$ Generation Partnership Project; Technical Specification Group Radio Access Network; Evolved Universal Terrestrial Radio Access (E-UTRA); Physical Layer procedures (Release 8)." 3GPP TS 36.213 V8.8.0, 2009, 3GPP Organizational Partners.

"3$^{rd}$ Generation Partnership Project; Technical Specification Group Radio Access Network; Evolved Universal Terrestrial Radio Access (E-UTRA); Multiplexing and Channel Coding (Release 8)." 3GPP TS 36.212 V8.5.0, 2008, 3GPP Organizational Partners.

"3$^{rd}$ Generation Partnership Project; Technical Specification Group Radio Access Network; Evolved Universal Terrestrial Radio Access (E-UTRA); Physical Layer Procedures (Release 8)." 3 GPP TS 36.213 V8.7.0, 2009, 3GPP Organizational Partners.

"3$^{rd}$ Generation Partnership Project; Technical Specification Group Radio Access Network; Evolved Universal Terrestrial Radio Access (E-UTRA); Protocol Specification (Release 8)." 3GPP TS 36.331 V8.5.0, 2009, 3GPP Organizational Partners.

Taiwanese Office Action issued in Taiwanese Application No. 10320076720 dated Jan. 20, 2014.

Chinese Office Action issued in Chinese Application No. 201080060533.9 dated Apr. 30, 2014 (translation).

Japanese Office Action issued in Japanese Application No. 2012-548012 dated May 20, 2014 (translation).

Notice of Preliminary Rejection of Korean Patent Application 10-2012-7020360 dated Nov. 8, 2013.

Notice of Reason for Refusal of Japanese Patent Application 2012-548012 dated Aug. 29, 2013 with English Translation.

* cited by examiner

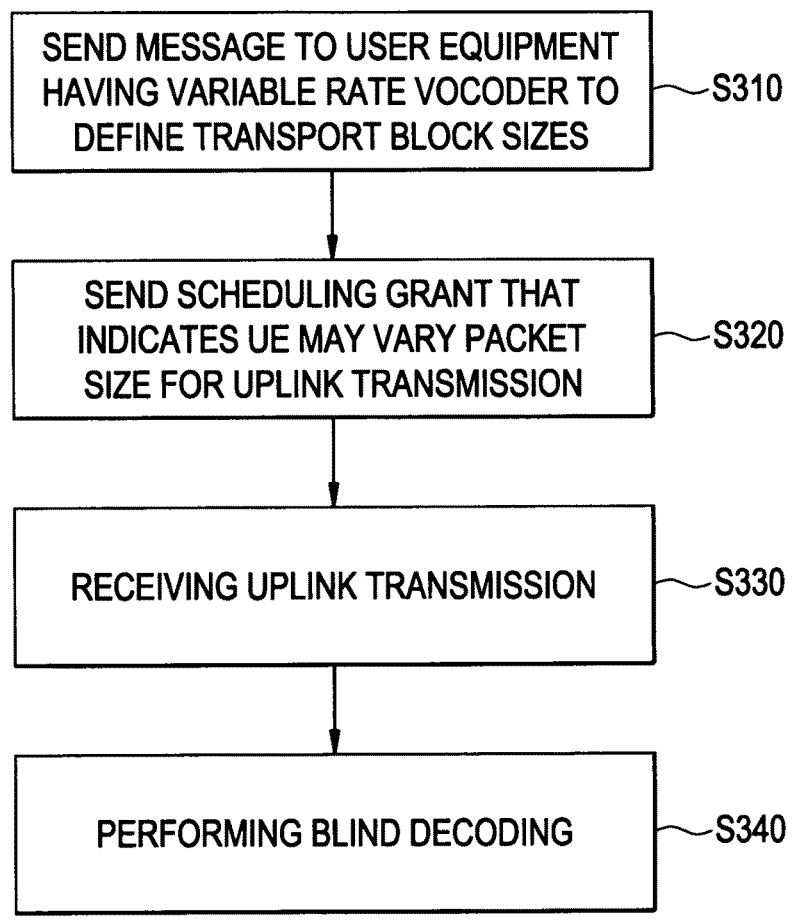

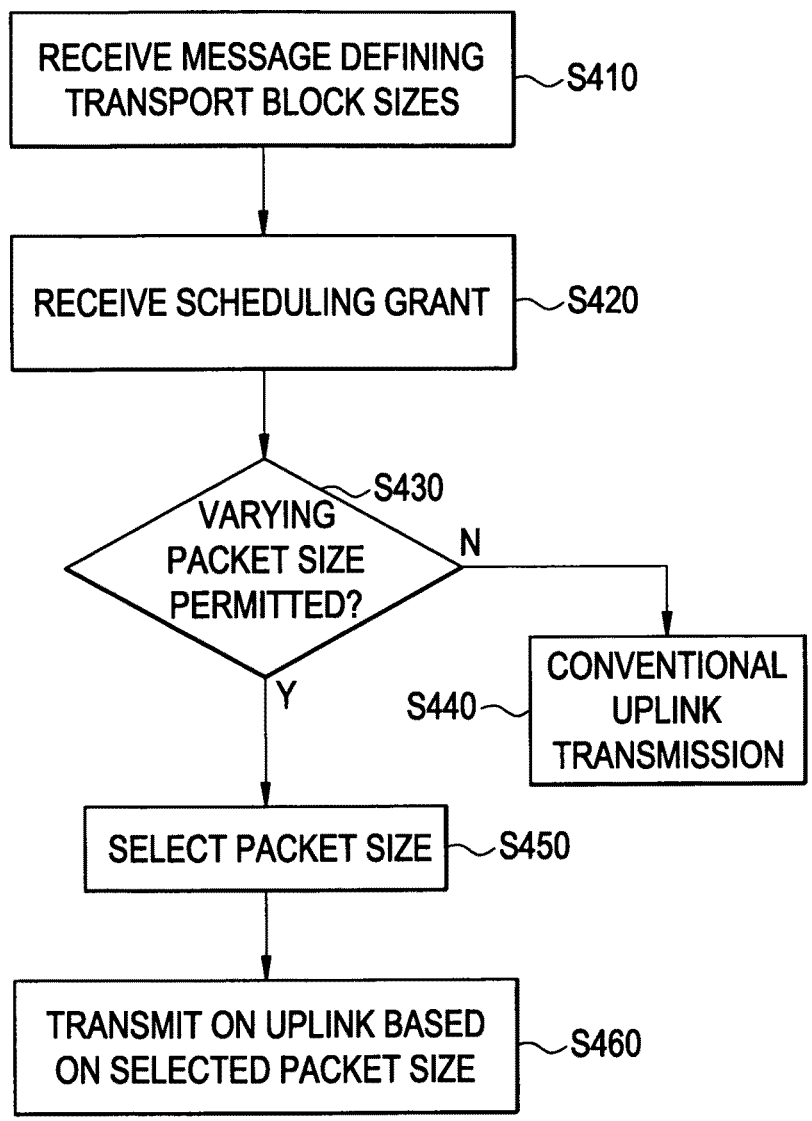

METHOD TO IMPROVE VOICE OVER IP CAPACITY FOR USER EQUIPMENT EMPLOYING VARIABLE RATE VOCODERS

BACKGROUND OF THE INVENTION

As the 3GPP evolves UMTS to a pure packet switched technology in 3GPP Long Term Evolution (LTE), the way voice traffic will be carried is in the form of Voice over IP (VoIP). The current support of voice over IP (VoIP) in 3GPP LTE is tailored to the adaptive multirate (AMR) vocoder which has been used in GSM and UMTS. For CDMA operators migrating to LTE, enhanced variable rate codec (EVRC) is the vocoder of choice, given that it is currently used in their CDMA network and they wish to avoid the delay and quality degradation which would occur if they had to transcode EVRC to AMR when they migrate to LTE (that is, anytime an LTE user on their network called an EV-DO user or 1x user, transcoding would have to occur between the AMR codec on the LTE network and the EVRC codec on the 1x and EV-DO networks).

Unlike the AMR vocoder, the EVRC vocoder generates variable sized packets during a talk spurt, and the improved EVRC-B vocoder actually allows different modes which can utilize smaller packets more often in order to improve capacity on CDMA networks while trading off some quality in the speech.

Unfortunately, the current LTE uplink support for VoIP only allows the UE to transmit with a single packet size, which has to be large enough in order to accommodate the largest VoIP packet size. This is fine for AMR vocoders which output just one packet size during a talk spurt (for example 244 bits for AMR 12.2 kbps), however it becomes quite inefficient for the EVRC vocoder which outputs a variety of packet sizes during a talk spurt (as large as 171 bits and as small as 40 bits). This results in significant padding overhead using the current 3GPP LTE standard, which in turn results in higher than needed UE transmit power level that generates extra interference to other cells, and in the end reduces overall system capacity.

SUMMARY OF THE INVENTION

The present invention relates to improving voice over internet protocol (VoIP) capacity for user equipment employing variable rate vocoders.

In one embodiment, a message is sent from the wireless network to a user equipment having a variable rate vocoder. The message defines transport block sizes for the user equipment to select from in making uplink transmissions if the user equipment is permitted to vary a packet size for uplink transmission. A scheduling grant is sent to the user equipment, and the scheduling grant includes an indicator indicating that the user equipment is permitted to vary the packet size for uplink transmissions by selecting a transport block size from among the defined transport block sizes.

In one embodiment, the message is a radio resource control message. The message may indicate, for example, four different transport block sizes such as 256 bits, 136 bits, 104 bits and 72 bits. However the message may indicate more or less than four transport block sizes.

In one embodiment, the indicator indicates that the user equipment is permitted to select a smallest of the defined transport block sizes that permits delivery of data in a buffer of the user equipment. The indicator in the scheduling grant may be an unused modulation and coding scheme level.

In another embodiment, the method further includes setting a power control rule to permit the user equipment to change transmit power based on the packet size of uplink transmission.

A further embodiment includes performing blind decoding of received transmissions from the user equipment based on the defined transport packet sizes.

In another embodiment, user equipment having a variable rate vocoder receives a message defining transport block sizes for the user equipment to select from in making uplink transmissions if the user equipment is permitted to vary a packet size for uplink transmission. The user equipment may further receive a scheduling grant including an indicator indicating that the user equipment is permitted to vary the packet size for uplink transmissions by selecting a transport block size from among the defined transport block sizes. The user equipment selects a transport block size from among the defined transport block sizes if the indicator indicates that the user equipment is permitted to vary the packet size for uplink transmissions by selecting a transport block size from among the defined transport block sizes, and transmits a packet on the uplink based on the selected transport block size.

In one embodiment, the user equipment selects a smallest of the defined transport block sizes that permits delivery of data in a buffer of the user equipment.

BRIEF DESCRIPTION OF THE DRAWINGS

Example embodiments of the present invention will become more fully understood from the detailed description provided below and the accompanying drawings, wherein like elements are represented by like reference numerals, which are given by way of illustration only and thus are not limiting of the present invention and wherein:

FIG. 3 illustrates a flow chart of a method of scheduling and processing variable size uplink transmission by the network according to an example embodiment.

FIG. 4 illustrates a flow chart of a method of performing scheduled uplink transmission at user equipment according to an example embodiment.

DETAILED DESCRIPTION OF EXAMPLE EMBODIMENTS

Figure 1:
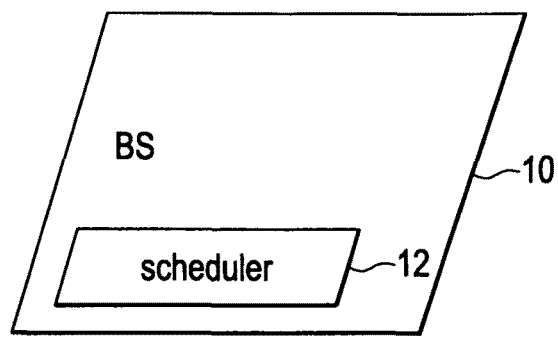
FIG. 1 is a diagram illustrating a portion of a wireless network.
Figure 1:
Figure 1:
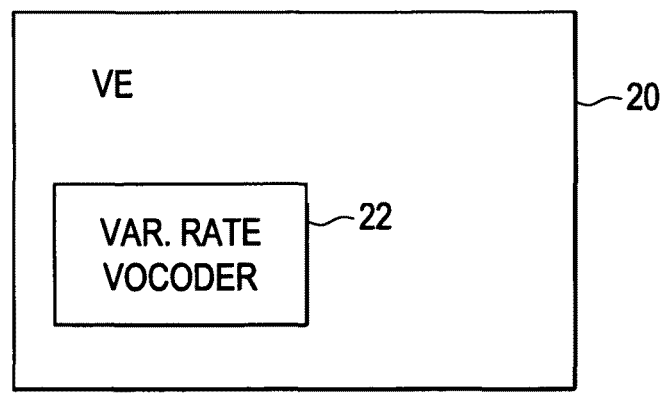

Various example embodiments of the present invention will now be described more fully with reference to the accompanying drawings in which some example embodiments of the invention are shown. In the drawings, the thicknesses of layers and regions are exaggerated for clarity.

Detailed illustrative embodiments of the present invention are disclosed herein. However, specific structural and functional details disclosed herein are merely representative for purposes of describing example embodiments of the present invention. This invention may, however, may be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, the term "user equipment" may be considered synonymous to, and may hereafter be occasionally referred to, as a mobile, mobile unit, mobile station, mobile user, subscriber, user, remote station, access terminal, receiver, etc., and may describe a remote user of wireless resources in a wireless communication network. The term "base station" may be considered synonymous to and/or referred to as a base transceiver station (BTS), NodeB, extended Node B, femto cell, access point, etc. and may describe equipment that provides the radio baseband functions for data and/or voice connectivity between a network and one or more users.

FIG. 1 illustrates a portion of a 3GPP Long Term Evolution (LTE) wireless network. As shown, a base station 10 serves the wireless communication needs of user equipment (UE) 20. In FIG. 1, only a single user equipment 20 and only a single base station 20 is shown. However, it will be understood that the base station 20 may service the wireless communication needs of a plurality of user equipments, and the network may include a plurality of base stations.

The base station 10 includes a scheduler 12, which schedules uplink transmissions (UE to wireless network transmissions) of the user equipment 20. The user equipment includes a variable rate vocoder 22 such as an EVRC or ECRC-B vocoder.

Voice over IP traffic can be supported in the LTE uplink via dynamic scheduling or via semi-persistent scheduling by the scheduler 12. In dynamic scheduling, the scheduler 12 issues a scheduling grant for each VoIP packet that is transmitted by the UE 20. This method is inefficient in terms of scheduling grant utilization (which is a limited resource in LTE), and hence semi-persistent scheduling was introduced. Semi-persistent scheduling allows the base station scheduler 12 to send one scheduling grant to the UE 20, and this scheduling grant becomes persistent in the sense that the UE 20 understands this grant to mean the UE 20 is allowed to transmit without any additional scheduling grants every X ms using the format specified in the initial scheduling grant. The periodicity X of the grant is configured via higher layer signaling (e.g., radio resource control (RRC) signaling) at call setup. A typical value for X would be 20 ms, which aligns with the rate at which speech frames are generated from many vocoders (such as the AMR and EVRC/EVRC-B vocoders).

In the case of AMR, when the user is speaking, the vocoder will generate a packet of a fixed size every 20 ms. In the case of AMR 12.2 kbps vocoder, the packet size is 244 bits for every speech frame generated. The base station scheduler 12 would assign a modulation and coding scheme (MCS) level in the dynamic grant or in the initial semi-persistent grant that matches the packet size expected in the UE's MAC layer. With the RTP/UDP/IP/PDCP/RLC/MAC overheads together with robust header compression (ROHC) in the PDCP layer, the 244 bit speech frame will become a 312 bit MAC service data unit (SDU). Based on the current transport block size table in TS 36.213, a block size of 328 bits would be a reasonable choice to indicate in the scheduling grant.

Now when the EVRC or EVRC-B vocoder is used such as with UE 20, there are four different sizes of the speech packet that are generated by the vocoder 22 while the user is speaking. These four different sizes are referred to as full rate frames, half rate frames, quarter rate frames, and eighth rate frames. The frame sizes generated by the vocoder 22 and with the overheads at the MAC layer, as well as the fraction of time they are utilized during typical speech are given in Table 1 below for EVRC-B mode 4.

Figure 2:
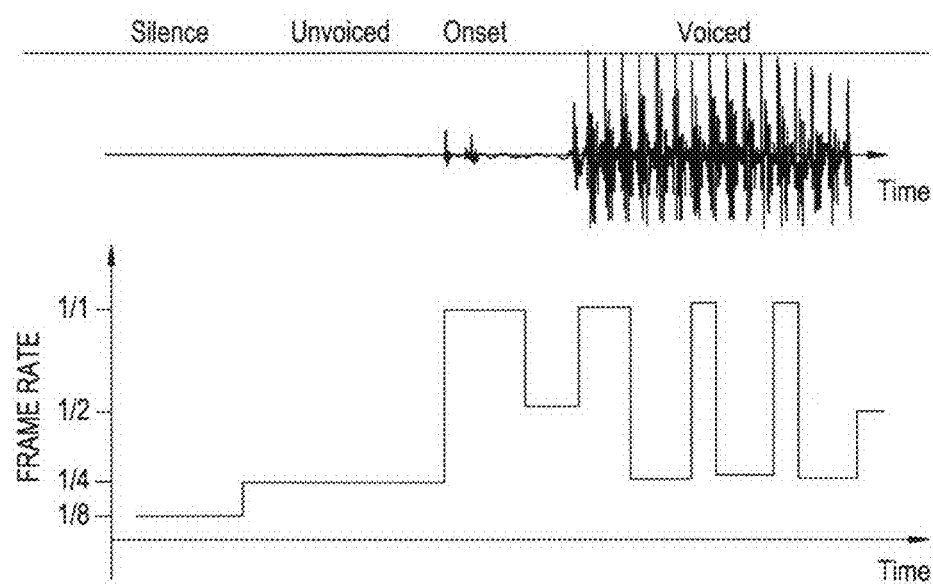
FIG. 2 illustrates selection of full rate, half rate, quarter rate and eighth rate by an EVRC-B vocoder as a function of speech.

There is no way for the base station scheduler 12 to know which packet size is going to be generated by the EVRC vocoder 22 as this depends on the actual speech of the talker as illustrated in FIG. 2. Therefore, even with dynamic scheduling the base station scheduler 12 must choose to schedule a transport block size which is big enough to hold the largest packet, in this case a MAC SDU size of 232 bits. The closest transport block size available in TS 26.213 is 256 bits, hence the base station scheduler 12 will always schedule a MAC PDU size of 256 bits. When smaller MAC SDU packets are present, the MAC layer at the UE 20 must pad extra bits to fill up the 256 bit grant, which results in padding overhead. This is illustrated in Table 2, where the padding overhead for each frame type is given as well as the average padding overhead computed using the fraction of time that each frame type is used during active speech. The average overhead is 148%.

TABLE 1

EVRC-B Mode 4 packet size and utilization

|  | Vocoder Packet Size (bits) | MAC SDU Packet Size (bits) | Percentage utilized in typical speech (includes silence) | Percentage utilized during active speech (excludes silence) |
|---|---|---|---|---|
| Full Rate Frame | 171 | 232 | 22% | 52% |
| Half Rate Frame | 80 | 136 | 2% | 5% |

TABLE 1-continued

EVRC-B Mode 4 packet size and utilization

| | Vocoder Packet Size (bits) | MAC SDU Packet Size (bits) | Percentage utilized in typical speech (includes silence) | Percentage utilized during active speech (excludes silence) |
|---|---|---|---|---|
| Quarter Rate Frame | 40 | 96 | 16% | 38% |
| Eighth Rate Frame | 16 | 72 | 2% | 5% |
| Blanked (silence during no speech) | 0 | 0 | 58% | 0% |

TABLE 2

Padding Overhead for EVRC-B Based on Current Specification

| | MAC SDU Packet Size (bits) | MAC PDU Size (bits) | Percentage utilized in active speech | Padding Overhead |
|---|---|---|---|---|
| Full Rate Frame | 232 | 256 | 52% | 10% |
| Half Rate Frame | 136 | 256 | 5% | 88% |
| Quarter Rate Frame | 96 | 256 | 38% | 167% |
| Eighth Rate Frame | 72 | 256 | 5% | 1500% |
| Average Padding Overhead | | | | 148% |

According to an embodiment of the present invention, a new type of scheduling grant for the uplink (e.g., LTE uplink) has been developed. This new scheduling grant allows the base station scheduler 12 to inform the UE 20 that the UE's MAC layer is allowed to autonomously select the most appropriate transport block size (e.g., MAC PDU size) from a defined list of allowed transport block sizes. The defined list may be conveyed at call setup by higher layer signaling (e.g., RRC signaling), and a special indicator in the scheduling grant by the base station 10 informs the UE 20 that the UE 20 is allowed to autonomously select the most appropriate packet size from this defined set.

FIG. 3 illustrates a flow chart of a method of scheduling and processing variable size uplink transmission by the network according to an example embodiment. As shown, in step S310, the base station 10 sends a message to the UE 20 to define the transport block sizes. As discussed above, this message may be conveyed at call setup. For example, a higher layer configuration may be to inform the UE 20 of this restricted set of transport block sizes. More specifically, this information may be included in the current RRC signaling message used for semi-persistent scheduling. As a specific example, the SPS-ConfigUL information element in the well known TS 36.331 protocol may be amended to include the variable:
  BlindDecodingTransportBlockSizeSet
  INTEGER{TBS1, TBS2, TBS3, TBS4}
where TBS1, TBS2, TBS3 and TBS4 are the four transport block sizes the UE may select from for uplink transmission.

For example, with reference to the allowed transport block sizes in 3GPP TS 36.213, a set of allowed transport block sizes according to one embodiment is {256, 136, 104, 72} bits. These currently are transport block sizes allowed in the 3GPP specification.

Next, in step S320, the base station scheduler 12 may send a scheduling grant that indicates the UE 20 may vary the packet size for uplink transmission. In this disclosure, the terms packet size, transport block size and MAC PDU size will be used interchangeably. In one embodiment, the scheduling grant includes a special indicator to inform the UE that the UE is allowed to autonomously choose the smallest packet size from the defined set that allows delivery of the data in the UE's buffer. For example, this special indication in the UL scheduling grant may be to signal modulation and coding scheme (MCS) level 30, 31, or 32, which are currently reserved values unused in the 3GPP specification.

Assuming the indicator does indicate the UE 20 is permitted to autonomously select the transport block size from the defined transport block sizes, the UE 20 selects the transport block size and transmits on the uplink based on the selected transport block size (see FIG. 4 below). In this case the MAC PDU (i.e., transport block) padding overhead would be reduced down to just 8.2% on average, as illustrated in Table 3.

TABLE 3

Padding Overhead for EVRC-B Based on Proposed Scheme with 4 transport block sizes in the pre-defined set

| | MAC SDU Packet Size (bits) | MAC PDU Size (bits) | Percentage utilized in typical speech | Padding Overhead |
|---|---|---|---|---|
| Full Rate Frame | 232 | 256 | 52% | 10% |
| Half Rate Frame | 136 | 136 | 5% | 0% |
| Quarter Rate Frame | 96 | 104 | 38% | 8% |
| Eighth Rate Frame | 72 | 72 | 5% | 0% |
| Average Padding Overhead | | | | 8.2% |

The base station 10 receives an uplink transmission in step S330. After this, the base station 10 performs blind decoding in order to determine which packet size the UE selected. That is, the base station 10 attempts decoding of the transmission of the UE corresponding to the special scheduling grant assuming the UE chose one of the packet sizes (transport block sizes) based on the defined list. In this example 4 blind decodes are necessary. Given knowledge of how frequently the different packet sizes are used, the order of the blind decoding may follow this ordering; for example with EVRC-B mode 4: first attempt to decode the packet size corresponding to the full rate frame (256 bits in this example), then if that fails attempt to decode the packet size corresponding to the quarter rate frame, and then if that fails attempt decoding of the half rate frame and then the eighth rate frame. This would minimize the average number of blind decodings required, although the maximum would still be 4 in this example (which is the size of the defined transport block size set). Of course, instead of sequentially performing the blind decodings, decoding may be performed in parallel, or a combination of serial and parallel.

In another embodiment, the above method is further simplified. As evident from the EVRC-B mode 4 frame utilization statistics, the half rate and eighth rate frames are used very rarely. The full rate and quarter rate frames are used most of the time. Therefore, the defined transport block size set may be limited to 2 elements: {256, 104} bits. The MAC PDU padding overhead for this embodiment is illustrated in table 4 below, where the average padding overhead is just 14.8%. The advantage here is that only at most 2 blind decodings are required at the base station 10. It will also be appreciated the instead of defining less than four transport block sizes, more than four transport block sizes may be defined.

TABLE 4

Padding Overhead for EVRC-B Based on Proposed Scheme with 2 transport block sizes in the pre-defined set

| | MAC SDU Packet Size (bits) | MAC PDU Size (bits) | Percentage utilized in typical speech | Padding Overhead |
|---|---|---|---|---|
| Full Rate Frame | 232 | 256 | 52% | 10% |
| Half Rate Frame | 136 | 256 | 5% | 88% |
| Quarter Rate Frame | 96 | 104 | 38% | 8% |
| Eighth Rate Frame | 72 | 104 | 5% | 44% |
| Average Padding Overhead | | | | 14.8% |

FIG. 4 illustrates a flow chart of a method of performing scheduled uplink transmission at user equipment according to an example embodiment associated with the embodiment of FIG. 3. As shown, in step S410 the UE 20 receives the message sent in step S310 from the base station 10. As will be recalled, the message defines the permitted transport block sizes. Next, in step S420 the UE 20 receives a scheduling grant from the base station 10.

In step S430, the UE 20 determines whether the scheduling grant includes the special indicator indicating that the UE 20 is permitted to vary the packet size of uplink transmissions. For example, if the MCS level 30 is set, the UE 20 determines that the UE 20 is permitted to vary the packet size. If the MCS level 30 is not set, the UE 20 determines that the UE 20 is not permitted to vary the packet size. Namely, in step S440, conventional uplink transmission using a fixed maximum packet size will take place.

If varying the packet size is permitted, then in step S450 the UE 20 autonomously chooses in any well-known manner the smallest packet size (i.e., transport block size) from the defined set that allows delivery of the data in the UE's buffer. The UE 20 then transmits on the uplink based on the selected transport block size.

As is well known, the LTE standard allows autonomous adjustment of the UE transmit power spectral density with different transport block sizes (modulation and coding levels to be precise) by setting Ks=1.25 (as opposed to Ks=0) in the power control rule described in 3GPP TS 36.213. Accordingly, if base station 10 permits the UE 20 to vary the transport block size, then the base station 10 will set the power control rule Ks=1.25. This may be performed prior to sending the scheduling grant with the special indicator in step S320 of FIG. 3. When the UE 20 selects a smaller packet size from the defined set, it will also lower its transmit power spectral density, which has the advantage of improving UE battery life as well as improving system capacity by generating less interference. Of course, if a larger packet size is selected, the UE may increase its transmit power spectral density.

To quantify the reduction in transmit power achievable, link level simulations for transport block sizes of 256 bits, 136 bits, 104 bits, and 72 bits were performed. The simulations were run using real channel estimation and with power control enabled. The maximum number of HARQ transmission was set to 4, and a 1% post-HARQ BLER was targeted as the norm for VoIP traffic. QPSK modulation with 2 physical resource blocks (PRBs) was also used.

Table 5 shows that an almost 3 dB reduction in the required SINR is achieved for the quarter rate frame size compared to the conventional methodologies, which would have always utilized the 256 bit MAC PDU size. A 3 dB reduction in required SINR means the UE can transmit these packets using 3 dB less power (cut the transmit power in half), and the quarter rate frame is utilized almost 40% of the time during active speech with the EVRC-B mode 4 vocoder.

TABLE 5

Required SINR for each frame size with proposed scheme

| | MAC SDU Packet Size (bits) | MAC PDU Size (bits) | Required SINR (dB) per antenna | Reduction in required SINR compared to 256 bit MAC PDU size (dB) |
|---|---|---|---|---|
| Full Rate Frame | 232 | 256 | −2.5 dB | 0 dB |
| Half Rate Frame | 136 | 136 | −4.4 dB | 1.9 dB |
| Quarter Rate Frame | 96 | 104 | −5.3 dB | 2.8 dB |
| Eighth Rate Frame | 72 | 72 | −5.4 dB | 2.9 dB |

The invention being thus described, it will be obvious that the same may be varied in many ways. Such variations are not to be regarded as a departure from the invention, and all such modifications are intended to be included within the scope of the invention.

What is claimed:

1. A method, comprising:
   sending a message to a user equipment having a variable rate vocoder,
   the message defining two or more transport block sizes for the user equipment to select from in making uplink transmissions if the user equipment is permitted to vary a packet size for uplink transmissions during a talk spurt; and
   sending a scheduling grant to the user equipment,
   the scheduling grant including an indicator indicating that the user equipment is permitted to vary the packet size for uplink transmissions during a talk spurt, and autonomously select and use a transport block size from among the defined transport block sizes during the talk spurt,
   wherein the indicator indicates that the user equipment is to select a smallest of the defined transport block sizes that permits delivery of data in a buffer of the user equipment.

2. The method of claim 1, wherein the sending a message step sends a radio resource control message.

3. The method of claim 1, wherein the message indicates four different transport block sizes.

4. The method of claim 3, wherein the four different transport block sizes are 256 bits, 136 bits, 104 bits and 72 bits.

5. The method of claim 1, wherein the message indicates two different transport block sizes.

6. The method of claim 5, wherein the two different transport block sizes are 256 bits and 104 bits.

7. The method of claim 1, wherein the message defines a set of transport block sizes.

8. The method of claim 1, wherein the indicator in the scheduling grant is an unused modulation and coding scheme level.

9. The method of claim 1, wherein the indicator indicates that the user equipment is permitted to select a smallest of the defined transport block sizes that permits delivery of data in a buffer of the user equipment.

10. The method of claim 1, further comprising:
    setting a power control rule to permit the user equipment to change transmit power based on the packet size of uplink transmission.

11. The method of claim 1, further comprising: performing blind decoding of received transmissions from the user equipment to determine the selected transport block size from the defined transport packet sizes.

12. The method of claim 11, wherein the performing step sequentially performs blind decoding, for each of the defined transport packet sizes in a defined order, to determine the selected transport packet size.

13. The method of claim 11, wherein the performing step performs blinding decoding for each of the defined transport packet sizes in parallel.

14. The method of claim 11, further comprising:
    setting a power control rule to permit the user equipment to change transmit power based on the packet size of uplink transmission; and wherein
    the sending a message step sends a radio resource control message;
    the indicator in the scheduling grant is an unused modulation and coding scheme level.

15. A method, comprising:
    receiving, at user equipment having a variable rate vocoder, a message defining two or more transport block sizes for the user equipment to select from in making uplink transmissions if the user equipment is permitted to vary a packet size for uplink transmissions during a talk spurt; and
    receiving, at the user equipment, a scheduling grant, the scheduling grant including an indicator indicating that the user equipment is permitted to vary the packet size for uplink transmissions during a talk spurt by selecting a transport block size from among the defined transport block sizes; and
    selecting, at the user equipment, a transport block size from among the defined transport block sizes if the indicator indicates that the user equipment is permitted to vary the packet size for uplink transmissions during a talk spurt by autonomously selecting and using a transport block size from among the defined transport block sizes during the talk spurt, the user equipment selecting a smallest of the defined transport block sizes that permits delivery of data in a buffer of the user equipment; and
    transmitting a packet on the uplink based on the selected transport block size.

16. The method of claim 15, further comprising: setting power control based on a packet size of the packet for transmission if a power control rule permits the user equipment to change transmit power based on the packet size of uplink transmission.

* * * * *